United States Patent [19]
Thomas et al.

[11] Patent Number: 5,861,181
[45] Date of Patent: Jan. 19, 1999

[54] DIE CASTING MACHINES FRAME MODIFICATION

[75] Inventors: Joseph L. Thomas, Wildwood, Ill.; Robert T. Wolniak, Cornell, Wis.

[73] Assignee: Outboard Marine Corporation, Waukegan, Ill.

[21] Appl. No.: 493,378

[22] Filed: Jun. 21, 1995

[51] Int. Cl.⁶ .......................... B29C 45/64; B22D 17/26
[52] U.S. Cl. ...................... 425/188; 164/341; 425/190; 425/192 R; 425/593
[58] Field of Search .................... 425/188, 190, 425/192 R, 589, 593, 595, 451.6; 164/341, 342, 303, 340

[56] References Cited

U.S. PATENT DOCUMENTS

| | | | |
|---|---|---|---|
| 2,289,928 | 7/1942 | Parker | 164/342 |
| 2,411,999 | 12/1946 | Lester | 164/120 |
| 3,165,796 | 1/1965 | McDonald | 425/593 |
| 3,433,290 | 3/1969 | Eggenberger et al. | 164/303 |
| 3,882,588 | 5/1975 | McFalls et al. | 425/190 |
| 3,951,579 | 4/1976 | Myers et al. | 425/190 |
| 4,094,621 | 6/1978 | Hehl | 425/190 |
| 4,206,799 | 6/1980 | McDonald | 164/341 |
| 4,285,384 | 8/1981 | Wunder | 425/589 |
| 4,345,893 | 8/1982 | Prince | 425/190 |
| 4,555,228 | 11/1985 | Mishiike et al. | 425/190 |
| 4,815,518 | 3/1989 | Sulprizio | 164/412 |
| 5,017,120 | 5/1991 | Holzinger et al. | 425/190 |

*Primary Examiner*—James P. Mackey
*Attorney, Agent, or Firm*—Jones, Day, Reavis & Pogue

[57] ABSTRACT

A frame for a die casting machine, including a first side, a second side, a toggle endpiece and a die endpiece opposite the toggle endpiece, one of the first and second sides having an upper frame member with a die end and a toggle end, the die end being releasably secured to the die endpiece, and a lower frame member integrally joined to the die endpiece and the toggle endpiece, the other of the first and second sides having upper and lower frame members integrally joined to the die and toggle endpieces.

17 Claims, 4 Drawing Sheets

DIE CASTING MACHINES FRAME MODIFICATION

BACKGROUND OF THE INVENTION

The present invention relates generally to die casting machines, and specifically to such a machine made with a one piece frame for supporting the dies as well as the pressurized die clamping mechanism.

Die casting dies are used for making die castings and are usually composed of two structures that can be moved relative to each other to create the shape of a casting enclosed between them. Also, dies can be moved relative to the casting to enable removal of the casting upon formation. However, in some cases a casting cannot be formed using only two casting members, and an additional component is required, known as a core slide. The structure of the core slide, which includes a hydraulic core pulling cylinder, often extends beyond the "die space" and actually beyond the exterior dimensions of the die casting machine.

Die casting machines typically have long working lives, and this certainly applies to such machines manufactured by the Lester Engineering Company of Cleveland, Ohio. These so-called Lester machines, which are disclosed in U.S. Pat. No. 2,411,999, include an upper frame which is a one piece casting. The upper frame provides structural support for the hydraulic toggle mechanism which clamps the two dies together, as well as providing support for the dies themselves.

Originally built in the 1940's, the Lester machines established a reputation for durability and reliable operation due in part to the strong upper frame. The one piece upper frame construction not only provides substantial support for the 600,000 pounds of pressure generated by the clamping mechanism, but also maintains the alignment of the dies for higher quality castings.

Despite the advantages of Lester machines, their main advantage, the solid frame, is also their main disadvantage in the modern factory environment, especially where Just-In-Time manufacturing strategies are used. At the time the Lester machine was designed, operators would typically run a set of dies for a relatively long period of time between die changeovers. Thus, the time involved to make die changeovers was not considered a significant factor affecting manufacturing efficiency. In contrast, many modern factories need to change their dies on a more frequent basis, and in some cases several changes a day are required.

For dies which have several side core pulling cylinders, changeover in a Lester machine is a tedious process. This is because the side core pulling cylinders project beyond the fixed frame members in several directions. As such, the cylinders and dies cannot be removed as a unit without the cylinders becoming hung up on the frame. Thus, in the Lester machines, each time a die change must be performed, the core pulling cylinders must be disassembled before the dies can be pulled from the frame. Such die changes can take as long as 8 to 12 hours to complete.

Another disadvantage of dismantling the die set is that adjustments are often required to the core slide after it has been reassembled to the die to ensure that the castings produced are dimensionally correct. This adjustment is performed after at least one casting is made and measured. These adjustments further extend the time that a die casting machine is out of production for a die change.

More modern die casting machines have upper frames with movable rod-like upper frame members which slide linearly under either manual or automatic control away from the die area to permit the dies and core pulling cylinders to be removed as a unit. A major advantage of these more modern machines is that the replacement die set can be fully assembled prior to the change and be waiting at the machine for the removal of the previous die set. However, and keeping in mind the major advantage of the Lester machines with their solid frame, a significant design and operational problem of more modern die casting machines is that the newer frames must be specially built so that the movable frame members can be secured against the substantial clamping forces necessary in the die casting process, while maintaining accurate alignment of the dies. These modern frames are inherently less rigid than the Lester machines, and are consequently less accurate than the one piece frame type machines.

Accordingly, it is a principal object of the present invention to provide a modification for a one piece frame die casting machine which permits rapid changeovers of die sets having multiple core pulling cylinders.

Another object of the present invention is to provide a modification for a Lester type die casting machine which permits the temporary displacement of at least one frame member to permit the rapid exchange of die sets without requiring disassembly of the core pulling cylinders.

Yet another object of the present invention is to provide a mechanism for a Lester type die casting machine which accurately locates a displaceable frame member in position on the frame after exchange of die sets, and which also securely retains the frame member to the frame to withstand the significant clamping forces without causing misalignment of the dies.

Still another object of the present invention is to provide a mechanism for the conversion of a one piece frame type of die casting machine to permit rapid changes of die sets complete with core pulling cylinders, at a fraction of the cost of replacing the existing machine with a new die casting machine.

SUMMARY OF THE INVENTION

Accordingly, the above-listed objects are met or exceeded by the present modification for a die casting machine, in which at least one of the frame members is temporarily displaceable. The displaceable frame member permits the exchange of die sets and core pulling cylinders as a unit to speed die changeovers. In addition, a frame member guiding and locking mechanism is provided to accurately guide the frame member back into position and to retain it there during machine operation.

More specifically, the present invention provides a frame for a die casting machine, including a first side, a second side, a toggle endpiece and a die endpiece opposite the toggle endpiece. One of the first and second sides has upper and lower frame members each with a die end and a toggle end. On one of the upper and lower frame members, the die end is releasably secured to the die endpiece, and a second one of the upper and lower frame members is integrally joined to the die endpiece and the toggle endpiece. The other of the first and second sides has upper and lower frame members integrally joined to the die and toggle endpieces.

In another embodiment, the present invention provides a die casting machine including a one piece frame having a pair of upper frame members and a pair of lower frame members, each member having a die end and a toggle end. The die and toggle ends are integrally joined to respective die and toggle endpieces of the frame. A fixed die platen is disposed at the die endpiece, and a movable die platen is disposed in opposed relationship to the fixed die platen. Also included is a retractable clamping mechanism configured to reciprocally move the movable die platen in relation to the fixed platen, and for exerting a clamping force holding together die blocks fastened to the platens. An injector is provided for injecting molten material into the die end of the machine for the formation of cast articles in the die blocks. At least one of the upper frame members has at least a portion which is removably secured to the die endpiece to permit exchange of die blocks provided with side core pulling cylinders as a unit.

In another embodiment, the invention provides a method for modifying a Lester type die casting machine having a one piece upper frame with a pair of upper frame members, and a pair of lower frame members, each frame member having a die end integrally joined to a die endpiece and a toggle end integrally joined to a toggle endpiece. The method includes removing at least a portion of at least one of the frame members, installing a releasable portion to the frame to complete a connection to the toggle endpiece, installing a guide on the die endpiece for receiving an end of the releasable portion, and installing a locking mechanism on the frame for releasably locking the releasable portion to the frame.

DESCRIPTION OF THE PREFERRED EMBODIMENT

Figure 1:
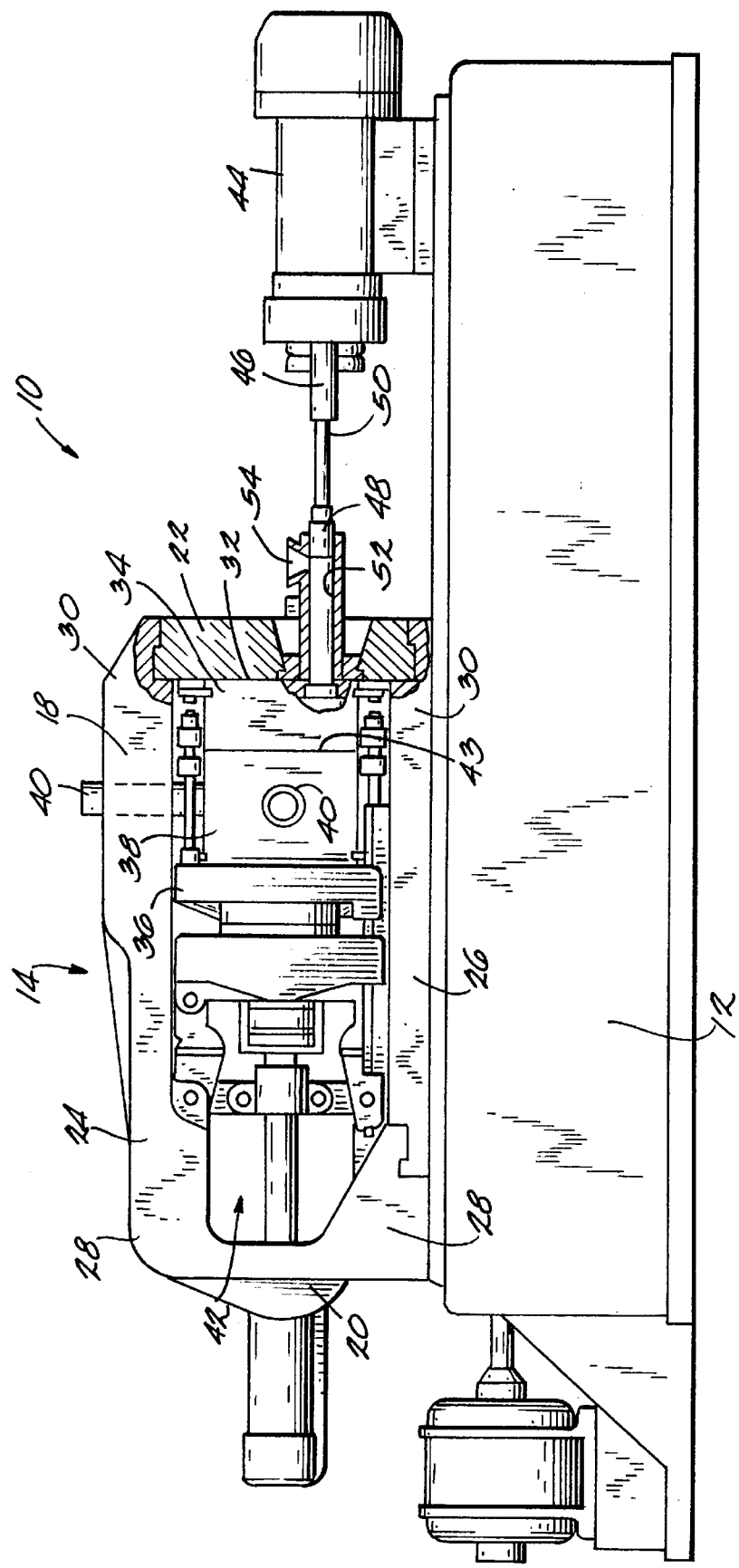
FIG. 1 is a side elevational view of a Lester-type die casting machine with a one piece frame of the type suitable for use with the present invention.

Referring now to FIG. 1, a one piece die casting machine of the type suitable for use with the present invention is generally designated 10. This type of machine was most notably manufactured by the Lester Engineering company of Cleveland Ohio.

The machine 10 includes a base 12 which supports the machine on a substrate, and an upper frame, generally designated 14, which rests upon, and is secured to the base. The frame 14 is generally bilaterally symmetrical about a vertical cross-section, and has a first side 16 (best seen in FIG. 2) and a second side 18 to which are connected a toggle endpiece 20 and a die endpiece 22. Each of the first and second sides 16, 18 has an elongate upper frame member 24 and a lower frame member 26 with a corresponding toggle end 28 and a die end 30.

Possibly the most significant feature of the Lester type die casting machine 10 is that the upper frame 14 is manufactured as an integral unit, preferably by a single casting. Thus, the upper and lower frame members 24, 26 are integrally formed with the toggle and die endpieces 20, 22. This structure provides the machine 10 with substantial strength and rigidity, which in turn facilitates the production of high quality castings. Such high quality is made possible due to the ability to maintain the die blocks in accurate alignment during repeated casting cycles.

A fixed die platen 32 is located on an inside surface of the die endpiece 22, and a fixed die block 34 is releasably mounted to the fixed platen as is known in the art. Opposite the fixed die platen 32 is located a movable or ejector die platen 36 upon which is mounted a movable die block 38. In some applications, the movable die block 38 is equipped with one or more side core assemblies, which include core pulling cylinders 40. The die blocks 34, 38 and the cylinders 40 are collectively referred to as the die set. The cylinders 40 often extend past the exterior dimensions of the frame 14. As such, in the Lester type machines 10, it is impossible to remove the die set from the machine as a unit. Instead, the cylinders 40 must each be disassembled from the die block 38 prior to removal of the die blocks 34, 38. This disadvantage of Lester type machines 10 entails a significant amount of time and labor, and often requires adjustments after reassembly to ensure proper dimensions of the resulting castings.

The movable platen 36 is moved reciprocally in relation to the fixed platen 32 by a toggle mechanism, generally designated 42. In the preferred embodiment, the toggle mechanism is hydraulic in nature, however other types of toggles, including mechanical toggle linkages, are contemplated. The toggle mechanism 42 is capable of generating approximately 600,000 pounds of clamping force for holding the die blocks 34, 38 in abutting relationship along a parting line 43 during the casting process. As such, during casting there are significant strains exerted on the frame 14.

Opposite from the toggle mechanism 42, a hydraulic pressure cylinder 44 is secured to the base 12. At least one tie rod (shown partially at 46) connects the cylinder 44 to the die endpiece 22. A casting plunger 48 is connected to a piston rod 50 of the cylinder 44 and is constructed and arranged to reciprocate in a pressure casting chamber 52. A preferably funnel-shaped material feed orifice 54 is provided in the chamber 52 for the introduction of material which is to be cast.

Figure 2:
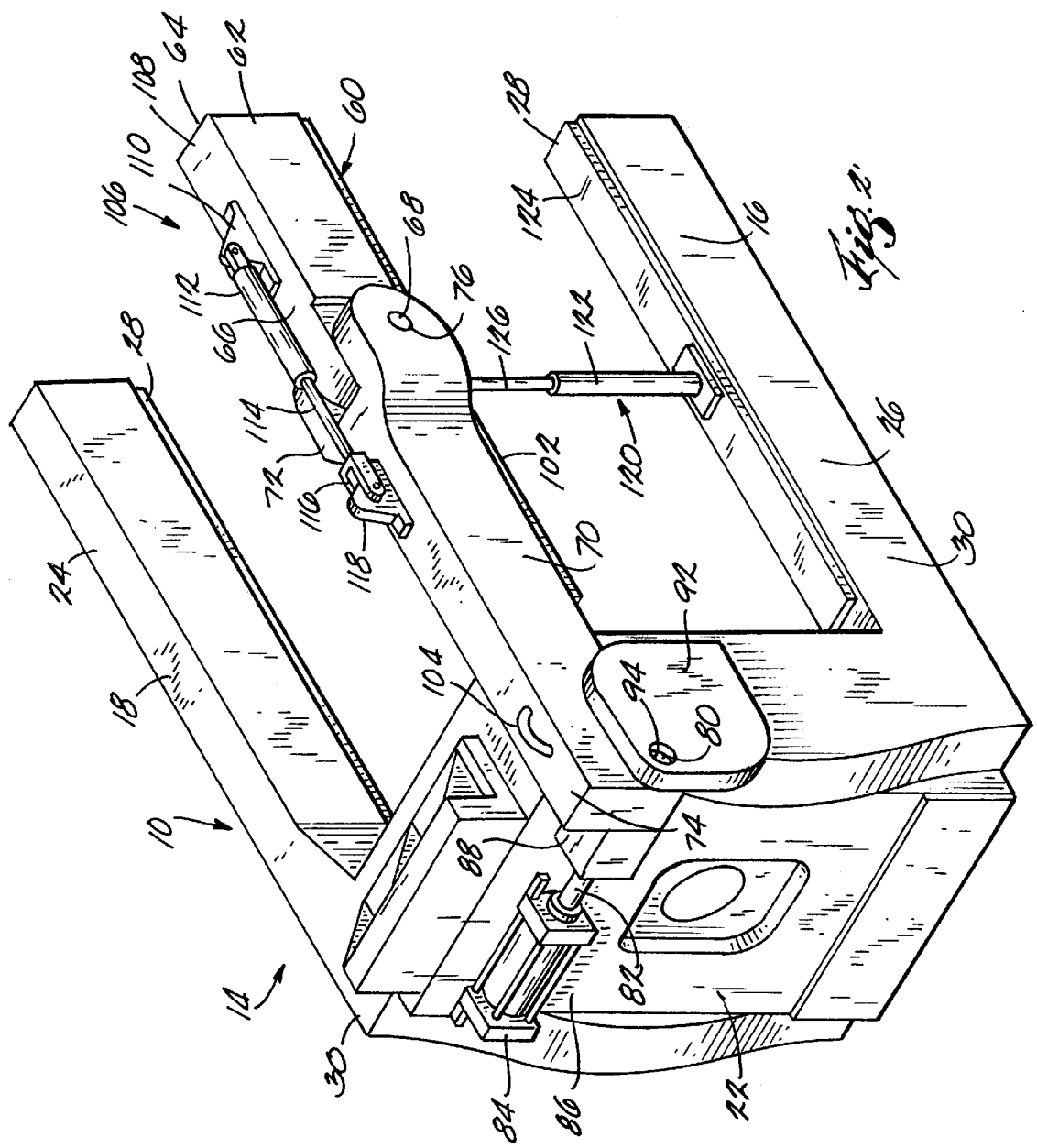
FIG. 2 is a top fragmentary perspective elevational view of the frame of the machine depicted in FIG. 1 equipped with the present frame modification, shown in the closed position, with portions omitted for clarity.
Figure 3:
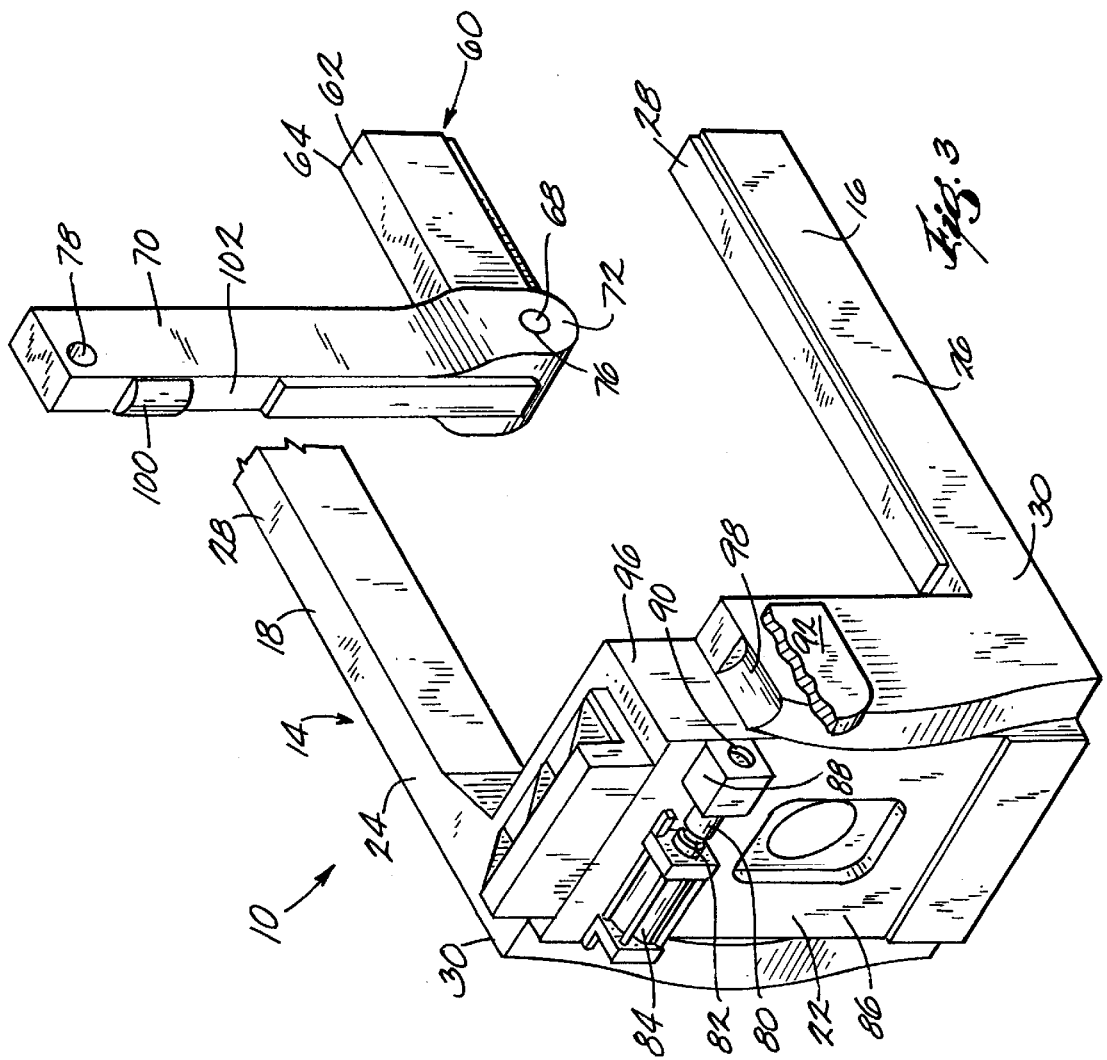
FIG. 3 is a top fragmentary perspective elevational view of the frame of machine depicted in FIG. 2 shown with the frame in the open position, with portions omitted for clarity.

Referring now to FIGS. 2 and 3, fragmentary perspective views of the upper frame 14 bearing the conversion of the invention are depicted. Specifically, in FIG. 2, it will be seen that one of the upper frame members 24, and particularly the member 24 on the first side 16, has been replaced with a conversion member generally designated 60. The conversion member 60 includes two main components, the first of which is a fixed portion 62 having a toggle end 64 integrally joined to the toggle endpiece 20, and a hinge end 66 opposite the toggle end. In the preferred embodiment, the hinge end 66 is laterally narrowed to facilitate the formation of a clevis joint, and is provided with a transverse throughbore (not shown) dimensioned to receive a pivot pin 68.

The second major component of the conversion member 60 is a pivotable portion 70 having a pivot axis end 72 configured as a clevis, and a die end 74 opposite the pivot axis end. At the pivot axis end 72, a transverse throughbore 76 is in registry with the throughbore of the hinge end 66 to accommodate the pivot pin 68. Both the fixed portion 62 and the pivotable portion 70 are dimensioned and made of a material which is at least of similar strength and grade to that of the remaining members 24, 26. The latter members preferably remain integrally joined to the frame 14 as originally manufactured. It is contemplated, however that the upper member 24 of either the first or second sides 16, 18 may be modified to receive the conversion member 60. It is also contemplated that in some applications one of the lower frame members 26 may alternately be replaced by the conversion member 60. The conversion member 60 includes the pivotable portion 70 which pivots between an operational or connected position depicted in FIG. 2, and a displaced or open position depicted in FIG. 3.

Turning now to the die end 74, a transverse locking throughbore 78 (best seen in FIG. 3) is positioned to receive a retractable locking pin 80 which is connected to the piston shaft 82 of a fluid powered locking cylinder 84. A principal function of the cylinder 84 is to maintain the engagement of the die end 74 with the die endpiece 22. The cylinder 84, preferably of the double-acting type, is mounted to an outer surface 86 of the die endpiece 22. It is contemplated, however, that a spring-return, single acting cylinder may also be used, and that hydraulic cylinders are preferred over pneumatic. A pin block 88 supports the reciprocating action of the locking pin 80, through a corresponding throughbore 90 (best seen in FIG. 3). The reciprocating action of the locking pin 80 is under operator control.

To receive the extended locking pin 80, a locking plate 92 is affixed to the corresponding side 16, 18 of the upper frame 14, and is provided with a throughbore 94 (best seen in FIG. 2) dimensioned and arranged to receive the locking pin. The plate 92 preferably extends vertically from the side of the frame 14 to provide lateral support to the pivotable portion 70. Once the die end 74 of the pivotable portion 70 fully engages the die endpiece 22 and reaches the operational position depicted in FIG. 2, the locking pin is inserted through the corresponding throughbores 90, 78 and 94 to secure the conversion member 60 in place.

Referring now to FIG. 3, to facilitate the removal of assembled die sets as a unit from the machine 10, the pivotable portion 70 of the conversion member 60 is retractable to an open position. In the open position, the pivotable portion 70 is preferably disposed past the substantially vertical position shown in FIG. 3, or at more than an approximate 90 degree angle to the fixed portion 62. This feature is provided to prevent the unwanted closure of the pivotable portion 70 upon the frame 14. To facilitate the engagement of the die end 74 with the die endpiece 22, the second side 18 of the frame 14 at the die end is notched to form a shoulder 96.

Further, it is preferred that a guiding device be provided to assist the pivotable portion 70 in becoming positively engaged to the die endpiece 22 as seen in FIG. 2. In the preferred embodiment, the guiding device takes the form of a tongue-in-groove arrangement, where the shoulder 96 includes a semi-cylindrical groove 98 which is dimensioned and disposed to matingly receive a semi-cylindrical tongue 100 located on an underside 102 of the pivotable portion 70. As the pivotable portion 70 returns to the operational position of FIG. 2 from the open position of FIG. 3, the shape of the tongue 100 will assist the pivotable portion in reaching the precise location as the groove 98 is engaged. In addition, the tongue-in-groove engagement helps to maintain the pivotable portion 70 in position on the frame 14, and further preserves the alignment of the frame which is critical to consistent castings.

The pivotable portion 70 may be provided with an eyelet 104 to accommodate an overhead hoist (not shown) to move it to the open position. Alternatively, the machine 10 may be provided with a powered lifting apparatus, generally designated 106 (best seen in FIG. 2), which is mounted to an upper surface 108 of the fixed portion 62. The apparatus 106 includes a frame 110 to which is pivotally attached an end of a fluid power cylinder 112. A shaft 114 of the cylinder 112 pivotally engages a clevis 116 which is pivotally mounted to a lug 118 on the pivotable portion 70. Retraction of the shaft 114 retracts the pivotable portion, and extension of the shaft lowers the pivotable portion to the operational position shown in FIG. 2.

Referring again to FIG. 2, an alternative to the powered lifting apparatus 106 is depicted generally as 120, and includes a fluid-powered jack 122 positioned vertically between the underside 102 of the pivotable portion 70, and an upper surface 124 of the lower member 26. The jack 122 may be a hydraulic cylinder, or other type of lifting device as known in the art. The specific size and placement of the jack 122 may vary with the application and the type of dies 34,38 used. Extension of a shaft 126 of the jack 122 will raise the pivotable portion 70 to the open position depicted in FIG. 3, and retraction of the shaft will return the portion 70 to the operational position depicted in FIG. 2.

Figure 4:
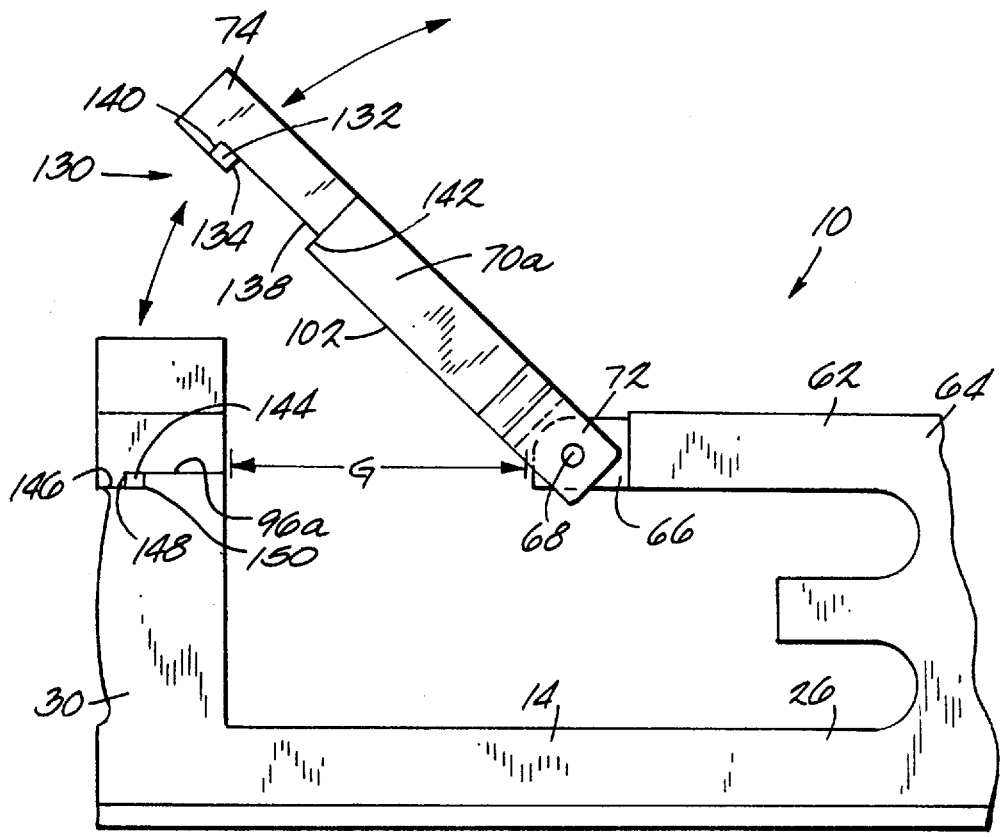
FIG. 4 is a fragmentary side elevational schematic view of the Lester-type die casting machine of FIG. 2 shown with an alternate locking mechanism.
Figure 5:
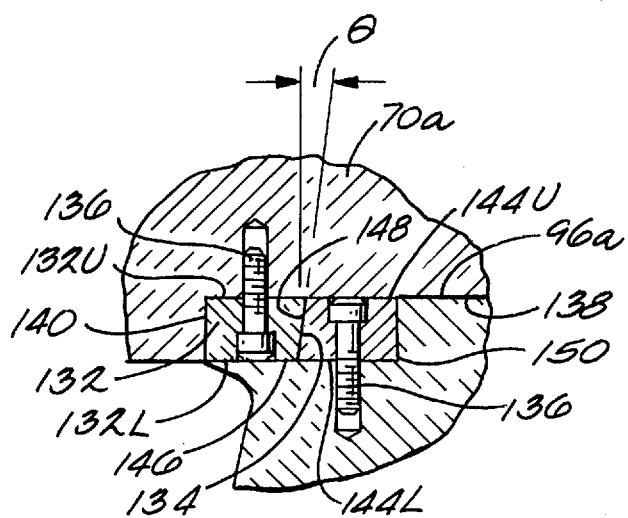
FIG. 5 is a fragmentary vertical sectional view of the locking mechanism of FIG. 4, shown in the engaged position.

Referring now to FIGS. 4 and 5, an alternate mechanism for securing or locking the die end 74 of the pivotable portion 70a with the shoulder 96a of the frame 14 is generally designated 130. Components 70a and 96a are modified from their counterparts 70 and 96 as described below.

An important feature of the locking mechanism 130 is that it monitors the alignment of the frame 14 as the pivotable portion 70a is pivoted about the pin 68 during the exchange of die sets. Due to the significant stresses on the frame generated by the substantial compressive forces inherent with the die casting operation, maintaining proper frame alignment is critical to optimum and safe machine operation.

The locking mechanism 130 includes a first block 132 fastened to the underside 102 of the pivotable portion 70a in a location generally corresponding to the tongue 100 shown in FIG. 3. In the preferred embodiment, the block 132 has at least one generally vertical, yet slightly angled face 134, which is inclined at an angle θ of approximately 5° relative to a vertical axis (best seen in FIG. 5). More specifically, an uppermost end 132U of the block 132 is longer horizontally than a lowermost end 132L when the machine is viewed from the side (best seen in FIG. 4). Also, the block 132 is releasably secured to the pivotable portion by a threaded countersunk fastener 136, however other suitable fastening technology is contemplated.

In this embodiment, the pivotable portion 70a differs from the pivotable portion 70 in that it is provided with an elongate recess 138 in its underside 102 which is defined by a wall 140 at the die end, and a wall 142 closer to the pivot axis end 72. It is preferred that the block 132 is fastened to the pivotable portion 70a so that it abuts the wall 140 as well as the recess 138, the latter two defining a corner for added support. The fastener 136 is provided with sufficient length so that a shim (not shown) may be placed between the block 132 and the recess 138 to permit vertical adjustment of the block. It is also preferred that the pivotable portion 70a defines an approximate radius of 54 inches measured between the pivot pin 68 and the face 134, with an approximate 36 inch gap G between the hinge end 66 and the shoulder 96a, however other lengths are contemplated depending on the application.

A second block 144, is secured by a countersunk threaded fastener 136 within a recess 146 of the shoulder 96a adjacent the die end 30. As is the case with the block 132, the fastener 136 is of sufficient length to permit vertical adjustment of the block 144 through the insertion of shims (not shown) between the block and the shoulder 96a.

A face 148 of the block 144 is generally vertical and is also angled a complementary 50 relative to the angle θ, and is constructed and arranged to slidingly contact the angled face 134 of the block 132. Thus, the uppermost end 144U of the block 144 is shorter horizontally than the lowermost end 144L. In similar fashion to the location of the block 132 on the pivotable portion 70a, the block 144 is supported within a corner 150 of the shoulder 96a.

Referring now to FIG. 5, which represents the engagement of the pivotable portion 70a upon the shoulder 96a, after exchange of a die set, once the pivotable portion 70a is returned to the operational position (best seen in FIG. 2), the first block 132 rests upon a seat 152 defined by the shoulder 96a and the second block 144. The tight angled friction fit between the blocks 132, 144, and especially the opposing angled faces 134 and 148, enhances the rigid relationship of the pivotable portion 70a with the upper frame 14.

Another feature of the locking mechanism 130 is that the engagement between the angled faces 134 and 148 provides an indication of the alignment of the machine 10. The configuration of the blocks 132, 144 is such that a deviation of only 0.0025 inch is permitted to maintain engagement of the faces 134, 148. If the machine 10 is not level, or if the frame members 24, 26 are not straight, the faces will not engage, preventing the locking of the pivotable portion 70. In such a case, the machine 10 will be inoperable until it is placed in proper alignment. This feature is provided to prevent damage to the machine through the significant forces applied in the die casting process.

The blocks 132 and 144 are preferably made of durable metallic material, and in the preferred embodiment are made of 8620 steel alloy with a case depth of 3/32 inch, which is heat treated to within the approximate range of 58–62 Rockwell hardness. However, their replaceability provides the capability of removing worn blocks and reinstalling fresh ones in the event wear or damage occurs.

In operation, a die casting machine having a one piece upper frame 14 of the Lester type is converted to having one frame member 24, 26 being removable or displaceable from the frame by removing the desired existing frame member at each of the toggle and die ends 28, 30. The shoulder 96 is then formed in the die endpiece 22, and the recess or groove portion 98 or 146 is formed. Next, the conversion member 60 is installed to replace the removed frame member, and the toggle end 64 of the fixed portion 62 is secured to the toggle endpiece 20. The pivotable portion 70 is then connected to the hinge end 66 of the fixed portion 62. The locking assembly 80, 82, 84, 88 and 92, or 130 is installed as necessary, as is the lifting apparatus 106.

During operation of the machine 10, the conversion member 60 is locked into the operational position shown in FIG. 2. The conversion member 60 maintains frame rigidity equivalent to that provided by the original frame member. When a die set change is required, the conversion member is unlocked and released from its engagement with the die endpiece 22. The pivotable portion 70 is then raised as needed to easily remove and replace die sets as a unit. The portion 70 is then replaced and relocked for continued operation. If the locking mechanism 130 is utilized, an indication of frame misalignment is provided by the inability to lock the pivotable portion 70a.

While a particular embodiment of the die casting machine frame of the invention has been shown and described, it will be appreciated by those skilled in the art that changes and modifications may be made thereto without departing from the invention in its broader aspects and as set forth in the following claims.

What is claimed is:

1. A frame for a die casting machine, comprising:
   a first side, a second side, a toggle endpiece and a die endpiece opposite said toggle endpiece;
   one of said first and second sides having upper and lower frame members each with a die end and a toggle end, on one of said upper and lower frame members said die end being releasably secured to said die endpiece and said toggle end being integrally formed with said toggle endpiece so that only said die end is displaceable relative to said die endpiece to create a space for exchanging at least one die block, a second one of said upper and lower frame members being integrally formed with said die endpiece and said toggle endpiece; and
   the other of said first and second sides having upper and lower frame members integrally formed with said die and toggle endpieces.

2. The frame as defined in claim 1 further including a locking mechanism configured to secure said releasable die end to said die endpiece.

3. The frame as defined in claim 2 wherein said upper frame member on one of said first and second sides is said releasable member, and said locking mechanism includes a transverse throughbore in said releasable upper frame member and a reciprocating pin mounted to said die endpiece to engage said throughbore.

4. The frame as defined in claim 2 wherein said upper frame member on one of said first and second sides is said releasable member, and said locking mechanism includes a first block secured to said releasable member, and a second block secured to the frame adjacent said die endpiece, said first and second blocks being arranged on said respective members to slidingly engage along opposing surfaces.

5. The frame as defined in claim 1 further including a power drive assembly for automatically moving said releasable die end automatically between an operating position and an open position.

6. The frame as defined in claim 1 further including guide means for guiding said releasable die end into engagement with said die endpiece.

7. The frame as defined in claim 6 wherein said guide means includes a tongue formation on said releasable die end and a groove formation on said die endpiece which is constructed and arranged to accommodate said tongue formation.

8. The frame as defined in claim 7 wherein said tongue formation is semi-cylindrical in shape.

9. The frame as defined in claim 1 wherein said frame member having said releasable die end includes a fixed portion integrally joined at a toggle end to said toggle endpiece and having a hinge end opposite said toggle end, and said frame member having said releasable die end also includes a pivotable portion having a pivot axis end dimensioned to engage said hinge end and including said die end for engaging said die endpiece.

10. The frame as defined in claim 9 further including drive means for moving said pivotable frame member portion between an operational position and a displaced position.

11. The frame as defined in claim 10 wherein said drive means includes a fluid power cylinder connected at one end to said fixed portion and at an opposite end to said pivotable portion.

12. A die casting machine, comprising:

a frame including a pair of upper frame members and a pair of lower frame members, each said member having a die end and a toggle end, said die and toggle ends being integrally joined to respective die and toggle endpieces of said frame;

a fixed die platen being disposed at said die endpiece;

a movable die platen disposed in opposed relationship to said fixed die platen;

retractable clamping means for reciprocally moving said movable die platen in relation to said fixed platen, and for exerting a clamping force holding together die blocks fastened to said platens;

injection means for injecting molten material into said die endpiece of said frame for the formation of cast articles in the die blocks;

at least one of said frame members having at least a portion being removably secured to said die endpiece to permit exchange of die blocks provided with side core pulling cylinders as a unit;

said at least one frame member having said removably secured portion including a fixed portion integrally joined at a toggle end to said toggle endpiece and having a hinge end opposite said toggle end, and said frame member also includes a pivotable portion having a pivot axis end dimensioned to engage said hinge end and including a die end for engaging said die endpiece.

13. The machine frame as defined in claim 12 further including drive means for moving said pivotable portion between a connected position and a displaced position.

14. The machine as defined in claim 12 further including locking means for securing said removably secured portion to said die endpiece.

15. The machine as defined in claim 12 further including guide means for guiding said removably secured portion into engagement with said die endpiece.

16. A frame for a die casting machine, comprising:

a first side, a second side, a toggle endpiece and a die endpiece opposite said toggle endpiece;

one of said first and second sides having upper and lower frame members each with a die end and a toggle end, on one of said upper and lower frame members said die end being releasably secured to said die endpiece, and a second one of said upper and lower frame members being integrally joined to said die endpiece and said toggle endpiece; and the other of said first and second sides having upper and lower frame members integrally joined to said die and toggle endpieces;

guide means for guiding said releasable die end into engagement with said die endpiece, said guide means includes a tongue formation on said releasable die end and a groove formation on said die endpiece which is constructed and arranged to accommodate said tongue formation.

17. A frame for a die casting machine, comprising:

a first side, a second side, a toggle endpiece and a die endpiece opposite said toggle endpiece;

one of said first and second sides having upper and lower frame members each with a die end and a toggle end, on one of said upper and lower frame members said die end being releasably secured to said die endpiece and a second one of said upper and lower frame members being integrally joined to said die endpiece and said toggle endpiece;

the other of said first and second sides having upper and lower frame members integrally joined to said die and toggle endpieces;

said frame member having said releasable die end includes a fixed portion integrally joined at a toggle end to said toggle endpiece and having a hinge end opposite said toggle end, and said frame member having said releasable die end also includes a pivotable portion having a pivot axis end dimensioned to engage said hinge end and including said die end for engaging said die endpiece.

* * * * *

UNITED STATES PATENT AND TRADEMARK OFFICE
CERTIFICATE OF CORRECTION

PATENT NO. : 5,861,181
DATED : January 19, 1999
INVENTOR(S) : Thomas et al.

It is certified that error appears in the above-identified patent and that said Letters Patent is hereby corrected as shown below:

On the title page, in the title,

--[54] DIE CASTING MACHINE FRAME MODIFICATION--.

Signed and Sealed this

Eleventh Day of May, 1999

Attest:

Q. TODD DICKINSON

*Attesting Officer*  *Acting Commissioner of Patents and Trademarks*